(No Model.)
E. J. DOLAN.
SOLDERING HOPPER.
No. 359,962. Patented Mar. 22, 1887.
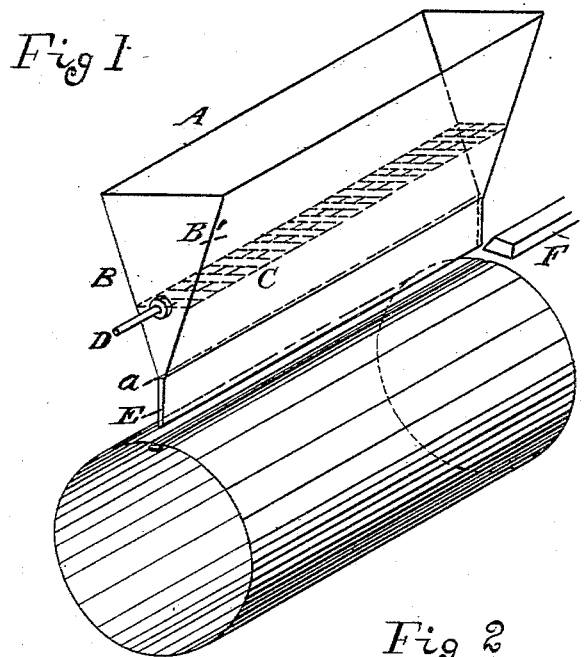
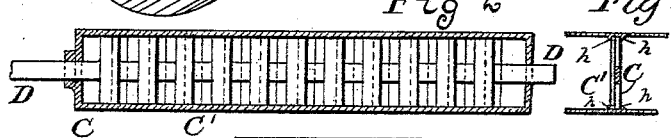
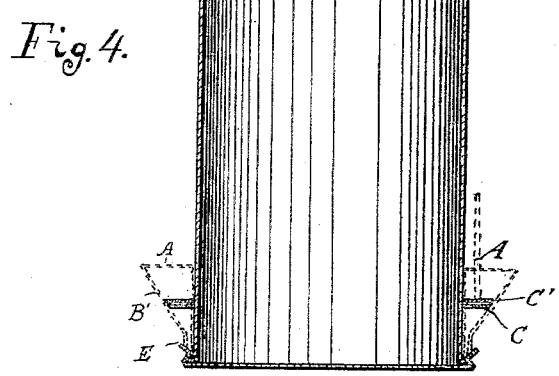
WITNESSES:
A. Ruppert
Alfred T. Gage.
INVENTOR
Edward J. Dolan
BY
Franklin H. Hough
ATTORNEY

UNITED STATES PATENT OFFICE.

EDWARD J. DOLAN, OF PHILADELPHIA, PENNSYLVANIA, ASSIGNOR TO WILLIAM HACKER, TRUSTEE, OF SAME PLACE.

SOLDERING-HOPPER.

SPECIFICATION forming part of Letters Patent No. 359,952, dated March 22, 1887.

Application filed July 17, 1886. Serial No. 208,331. (No model.)

*To all whom it may concern:*

Be it known that I, EDWARD J. DOLAN, a citizen of the United States, residing at Philadelphia, in the county of Philadelphia and State of Pennsylvania, have invented certain new and useful Improvements in Soldering-Machines; and I do hereby declare the following to be a full, clear, and exact description of the invention, such as will enable others skilled in the art to which it appertains to make and use the same, reference being had to the accompanying drawings and letters of reference marked thereon, which form a part of this specification.

This invention relates to soldering-hoppers, and has for its object to provide a simple and inexpensive device which will insure an even distribution of pulverized or granulated solder and resin along the seams of the metal to be soldered; and the invention consists in the peculiar construction of the hopper, all as more fully hereinafter described, and specifically defined by the claim.

In the drawings, Figure 1 is a perspective view of a solder-distributing device constructed in accordance with my invention. Fig. 2 is a plan view of the grate. Fig. 3 is a cross section of the grate and its connections. Fig. 4 is a longitudinal vertical section of a metal box, showing in dotted lines a modified form of my distributer adapted for use in soldering the ends of the box.

Referring to the drawings by letter, A represents the form of hopper such as is adapted for use in depositing pulverized solder and resin along the longitudinal seams of metallic boxes or cylinders. This hopper should be of substantially the same length as the box or cylinder to be soldered, and may be constructed of sheet metal, wood, or other material adapted to such use. The sides B B' are inclined inwardly, as shown, until the point $a$, near the lower edge of the hopper, is reached, below which point the sides are continued parallel, thus forming a narrow open space, E, extending the entire length of the hopper, through which the soldering material is deposited evenly along the seam of the can.

At any convenient point within the interior of the hopper a stationary perforated plate, C, is secured, and directly over the face of this stationary plate a corresponding perforated plate, C', is adjusted within suitable bearings to permit of a reciprocating movement being imparted to it by means of the extensions D, which project through suitable openings in the ends of the hopper.

In use the interlocking seam is formed in the sheet metal in any well-known way. The space within hopper A above the grate C is filled with pulverized or granulated solder and resin, the same having been previously mixed in suitable proportions. The hopper is placed in such a position that the opening along the bottom edge of the same is directly over the seam to be soldered, and by sliding the movable plate C', by means of the extension D, a suitable quantity of the soldering material is permitted to pass through the openings in the plate C, which material, after passing the plate, is caused, by means of the narrow chamber E, to be evenly distributed along the seam to be soldered, where it may be melted in any suitable manner—as, for instance, by a heated bar, F, moved along the under side of the seam.

In Fig. 4 of the drawings I have shown in dotted lines a modified form of hopper adapted for use in soldering the ends or bottoms of the cans, embodying substantially the same features as the form above described, except in its general contour.

The inner walls of the hopper A are provided with lugs $h$ $h$, which serve as supports and guides for the plates C C', as clearly shown in Fig. 3.

I am aware of the Patent No. 287,724, in which is shown a bottomless hopper, a perforated shell rigidly secured beneath the hopper, and a shaker perforated at the top and bottom within said shell and having a pitman-connection with an eccentric for reciprocating the same. This I disclaim. Neither do I claim, broadly, a hopper having a contracted discharge-orifice. I attach special importance to my hopper having controlled narrow discharge-orifice, whereby the feed is more even and may be regulated to a nicety by the simple adjustment of the plate C'.

Having thus described my invention and set forth its merits, what I claim to be new, and desire to secure by Letters Patent, is—

As an improved article of manufacture, the herein shown and described hopper, consisting of the parallel ends and the sides B B', inclined inwardly from the top to the point $a$, below which point they extend parallel with each other in proximity to form a contracted space, E, the rectangular stationary perforated plate C, secured within said hopper above the point $a$, and the rectangular perforated plate C', within said hopper above and supported by said plate C, and provided with means for operating said plate C', all substantially as set forth.

In testimony whereof I affix my signature in presence of two witnesses.

EDWARD J. DOLAN.

Witnesses:
CHAS. L. STURTEVANT,
ALFRED T. GAGE.